(12) United States Patent
Schumacher et al.

(10) Patent No.: US 7,506,512 B2
(45) Date of Patent: Mar. 24, 2009

(54) ADVANCED EFFUSION COOLING SCHEMES FOR COMBUSTOR DOMES

(75) Inventors: Jurgen C. Schumacher, Phoenix, AZ (US); Frank J. Zupanc, Phoenix, AZ (US); Rodolphe Dudebout, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 520 days.

(21) Appl. No.: 11/146,595

(22) Filed: Jun. 7, 2005

(65) Prior Publication Data

US 2006/0272335 A1    Dec. 7, 2006

(51) Int. Cl.
  *F23R 3/04* (2006.01)
(52) U.S. Cl. .......................................... 60/754; 60/756
(58) Field of Classification Search .................... 60/722, 60/752, 754, 756, 757; 431/182, 352
  See application file for complete search history.

(56) References Cited

U.S. PATENT DOCUMENTS

| | | | |
|---|---|---|---|
| 2,930,193 A | 3/1960 | Jaramillo | |
| 2,973,624 A | 3/1961 | Pierce et al. | |
| 3,705,492 A | 12/1972 | Vickers | |
| 4,380,905 A | 4/1983 | Smart et al. | |
| 5,129,231 A * | 7/1992 | Becker et al. | 60/754 |
| 5,142,871 A | 9/1992 | Lampes et al. | |
| 5,307,637 A | 5/1994 | Stickles et al. | |
| 5,509,270 A * | 4/1996 | Pearce et al. | 60/740 |
| 5,918,467 A | 7/1999 | Kwan | |
| 5,956,955 A * | 9/1999 | Schmid | 60/748 |
| 6,155,056 A | 12/2000 | Sampath et al. | |
| 6,442,940 B1 | 9/2002 | Young et al. | |
| 6,751,961 B2 | 6/2004 | Pacheco-Tougas et al. | |
| 6,955,053 B1 * | 10/2005 | Chen et al. | 60/804 |
| 2005/0241316 A1 * | 11/2005 | Nguyen et al. | 60/772 |

* cited by examiner

*Primary Examiner*—Louis J Casaregola
(74) *Attorney, Agent, or Firm*—Ingrassia Fisher & Lorenz, P.C.

(57) ABSTRACT

A cooling scheme for a dome comprises an effusion array drilled directly through a single walled dome. In one embodiment, the layout of the holes comprises two regions, a region close to the fuel injector where the holes follow a tangential path around the injector, and a second region where the direction of the holes is radially outward from the injector axis. A film of cooling air may be applied on the interior side of the combustor dome via an air swirler, which projects air radially outward from the injector axis. The first series of cooling holes supplement this air supply so that cooling efficacy is extended along the dome surface and is directed in a counter-rotating manner with respect to the main air swirler. The second series of dome cooling holes infuse further cooling flux that reduces the temperature in the corner regions between fuel injectors.

33 Claims, 11 Drawing Sheets

ADVANCED EFFUSION COOLING SCHEMES FOR COMBUSTOR DOMES

BACKGROUND OF THE INVENTION

The present invention generally relates to combustors for gas turbine engines and, more particularly, to cooling schemes for combustor domes.

Gas turbine combustion systems operate in extreme temperature environments, which ultimately limit the service life of the component. Cooling techniques are employed to lower the metal temperatures of combustor components to acceptable levels for durability and life. One of the most critical regions requiring cooling is the dome area.

Methods for cooling a combustor dome are described in U.S. Pat. No. 3,705,492. The dome cooling methods described are splash louver type designs whereby air is admitted through relatively large ports in the dome. The air impinges on deflector plates such as to direct the air in a circumferential manner. Although the described methods may be used for dome cooling, they require a large amount of cooling air. Cooling air in the dome region not only plays a part in mitigating wall temperatures but also interacts with primary zone aerodynamics. Typically, an excess of cooling air will adversely affect primary zone performance, particularly in the case of a rich quench lean (RQL) combustor. Further, a disproportionate amount of air required for dome cooling reduces the overall air budget required for cooling and performance of other components.

Another method for cooling a combustor dome is described in U.S. Pat. No. 5,307,637. The disclosed method comprises a baffle or heat shield having an inverted L-shaped ring. The '637 patent employs backside impingement cooling air at the ring to create a starter film for the downstream effusion cooling holes on the dome plate. The subsequent effusion cooling holes are then directed in a radially outward pattern from the center position of the injector aperture. In the absence of a starter air flow, film cooling effectiveness for radial effusion is low in the initial flow region and increases as one travels radially outward. The initial low film effectiveness is because radial effusion requires several rows of effusion holes for the cooling film to develop. Each individual effusion row by itself provides little protection, but it is only when the effect of a number of rows are superimposed on each other that sufficient thermal protection is provided. Although the starter film provided by the impingement air is designed to compensate for the initial low film effectiveness at the beginning of the radially directed cooling film, impingement cooling is less efficient than effusion cooling. Due to the low efficiency of impingement cooling the described method is not suitable for some applications.

Another method for cooling a combustor dome is disclosed in U.S. Pat. No. 5,918,467. The '467 patent describes a cooling scheme for a combustor heat shield comprising a multiplicity of small cooling holes in a preferential orientation. The heat shield is subdivided into four regions and transition areas, which bound the uniform effusion hole orientation in a given zone. The goal of the oriented effusion holes is to effectively cool all regions of the heat shield and complement the swirl created by the fuel injector air. Although the described method does not require creating a starter film with impingement air, it does require attaching a heat shield to the dome. Because the heat shield adds weight and manufacturing complexity to the dome, it is unsuitable for some applications.

As can be seen, a need exists for more efficient cooling schemes applied to the dome of a gas turbine combustor. Simplified cooling scheme designs are desirable due to beneficial manufacturing cost impacts. Cooling schemes requiring reduced amounts of cooling air are needed. Further, cooling methods are needed that do not require additional components, such as heat shields and louvers.

SUMMARY OF THE INVENTION

In one aspect of the present invention, a cooling scheme for a combustor dome comprises a plurality of tangential effusion holes positioned in the combustor dome and adapted to direct a first portion of cooling flow in a tangential direction around an injector axis of the combustor dome; and a plurality of radial effusion holes positioned in the combustor dome and adapted to direct a second portion of cooling flow radially outward from the injector axis.

In another aspect of the present invention, a cooling scheme for a combustor dome comprises a plurality of effusion holes through the combustor dome, the plurality of effusion holes comprising at least one tangential effusion hole positioned in a radially inward area and at least one radial effusion hole positioned in a radially outward area.

In still another aspect of the present invention, a cooling scheme for a combustor dome comprises a plurality of tangential effusion holes positioned through the combustor dome, the tangential effusion holes adapted to provide a tangential flow; a plurality of radial effusion holes positioned through the combustor dome and radially outward from the tangential effusion holes, the radial effusion holes adapted to provide a radial flow; and a plurality of transitional effusion holes positioned through the combustor dome, the transitional effusion holes adapted to direct a cooling flow such that the angle of the cooling flow transitions from the tangential flow of the tangential effusion holes to the radial flow of the radial effusion holes.

In yet another aspect of the present invention, a combustor for a gas turbine engine comprises an inner liner; an outer liner positioned radially outward from the inner liner; and a combustor dome positioned between and connected to the inner liner and the outer liner, the combustor dome having a plurality of tangential effusion holes and a plurality of radial effusion holes.

In another aspect of the present invention, an effusion array for an annular combustor dome having at least one air swirler comprises at least one row of tangential effusion holes positioned around the air swirler, the tangential effusion holes adapted to direct a swirl of cooling flow in a counter-rotating manner with respect to the air swirler, each tangential effusion hole forming a tangential angle of between about 75° and about 90° and forming an axial angle of between about 15° and about 30°, each tangential effusion hole having a diameter between about 0.01 and about 0.04 inches; a plurality of radial effusion holes positioned radially outward from the tangential effusion holes, the radial effusion holes adapted to direct a cooling flow radially outward from the air swirler, each radial effusion hole forming an axial angle of between about 15° and about 30° and having a diameter between about 0.01 and about 0.04 inches; and a plurality of transitional effusion holes positioned between the tangential effusion holes and the radial effusion holes, the transitional effusion holes adapted to direct a cooling flow such that the angle of the cooling flow transitions from the tangential flow of the tangential effusion holes to the radial flow of the radial effusion holes.

In a further aspect of the present invention, a method of cooling a combustor dome comprises the steps of passing a first portion of cooling flow through at least one tangential effusion hole of the combustor dome; and passing a second portion of cooling flow through at least one radial effusion hole of the combustor dome.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides cooling schemes for combustor domes and methods for cooling the same. Embodiments of the present invention may find beneficial use in many industries including aerospace, automotive, and electricity generation. The present invention may be beneficial in applications including annular combustors, can combustors and can-annular combustors. This invention may be useful in any combustor dome application. The present invention provides a simplified cooling mechanism on a gas turbine combustor while maximizing cooling efficiency.

Unlike conventional prior art designs, which employ heat shields, louvers and impingement cooling, the present invention may comprise a series of small holes directly through a single walled dome; an approach commonly referred to as effusion cooling. For a given quantity of air, effusion cooling may be more efficient at lowering wall metal temperatures while at the same time minimizing aerodynamic participation in the primary zone. In this manner a continuous film of cooling air may be supplied to the dome surface and may be tuned to interact with the primary zone aerodynamics to reduce pollutant emissions. Unlike the prior art methods that require heat shields and/or louvers, the present invention may simplify the cooling scheme in that no additional components need be attached to the dome structure. Manufacturing costs may be reduced due to a decrease in part count and an overall simplified design. The durability of the dome may be extended by a reduction in the temperature gradients along the metal surface.

Embodiments of the present invention provide cooling schemes for combustor domes. Implementation of the current invention may employ an array of small holes drilled through the dome wall at an acute angle to the dome surface in a pattern that maximizes cooling. In one embodiment, the layout of the holes may comprise two regions, a region close to the fuel injector where the holes follow a tangential path around the injector, and a second region where the direction of the holes is radially outward from the injector axis. A film of cooling air may be applied on the interior side of the combustor dome via an air swirler, which projects air radially outward from the injector axis. The first series of cooling holes may supplement this air supply so that cooling efficacy is extended along the dome surface and may be directed in a counter-rotating manner with respect to the main air swirler. The second series of dome cooling holes may infuse further cooling flux that reduces the temperature in the corner regions between fuel injectors.

Figure 1:
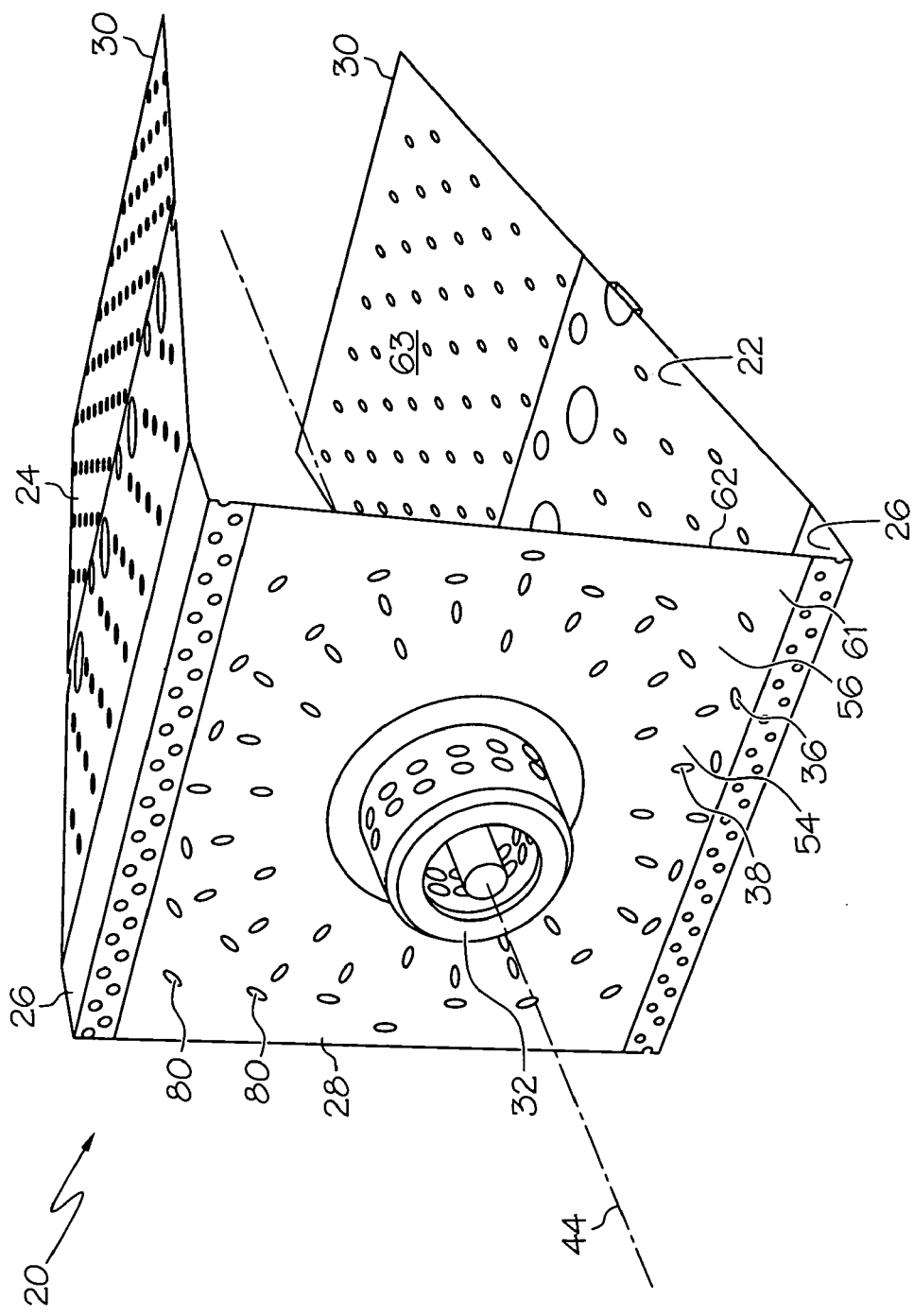
FIG. 1 is a perspective view of a section of a combustor according to an embodiment of the present invention.

A section of a combustor 20 according to an embodiment of the present invention is shown in FIG. 1. One of the more common combustor configuration types, an annular combustor, is depicted. The combustor 20 may comprise an inner liner 22 and an outer liner 24. The inner liner 22 and the outer liner 24 may be connected at an upstream end 26 by a dome 28. A downstream end 30 may be open and may connect to a turbine section of the engine (not shown). The upstream end 26 and the downstream end 30 may be defined with respect to the direction of a combustion gas flow (not shown) through the combustor 20. The combustor 20 may include an air swirler 32 positoned in the dome 28. A fuel injector (not shown) may be positioned radially inward from the air swirler 32.

Figure 2:
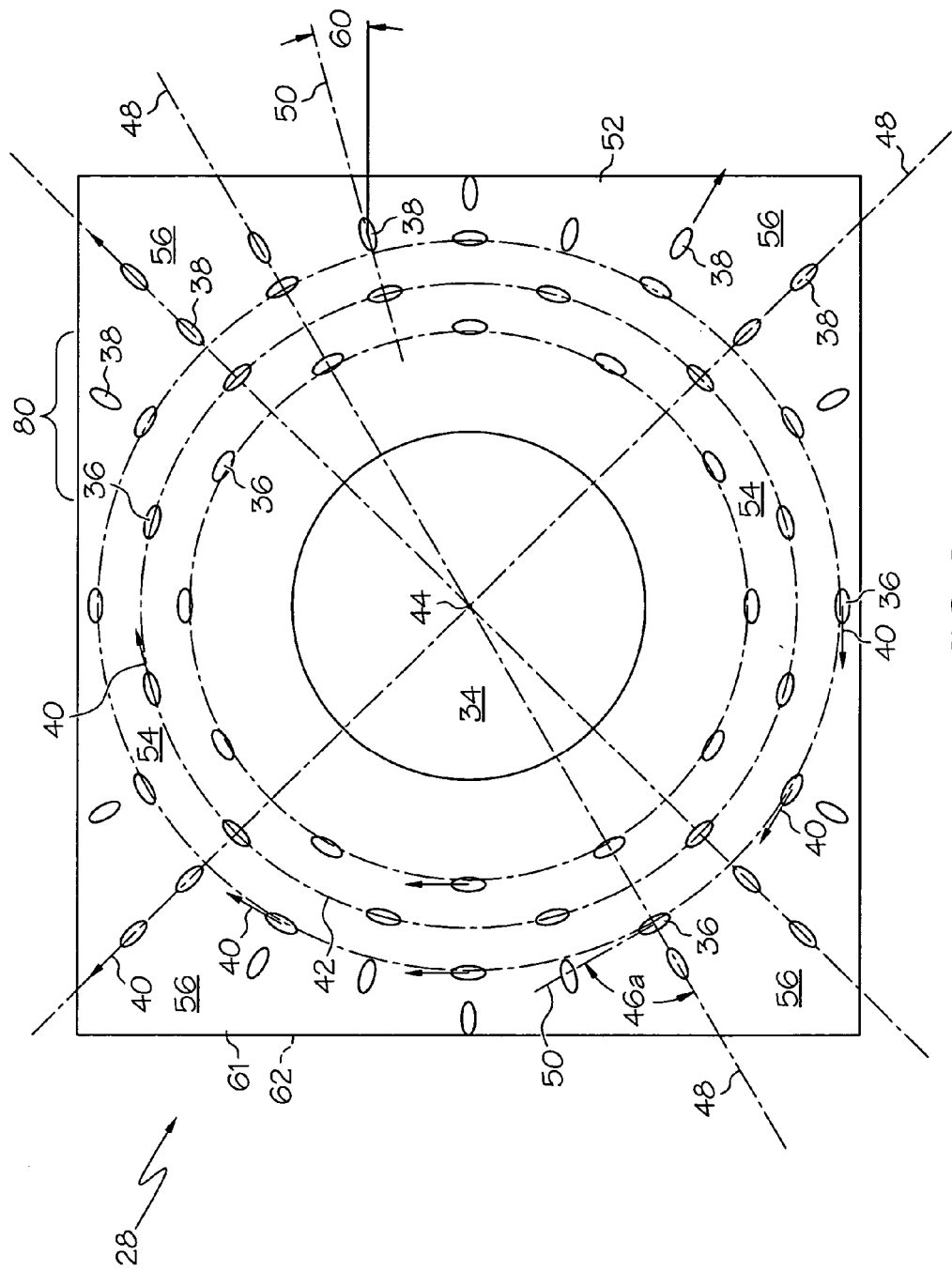
FIG. 2 is a plan view forward looking aft of a section of a combustor dome according to another embodiment of the present invention.

The dome 28, as depicted in FIG. 2, may comprise an opening 34 for receiving the fuel injector and the air swirler 32. The dome 28 may include a plurality of effusion holes 80. A cooling flow 40 may be passed through the effusion holes 80 from the cooler surface of the dome 28 to the surface exposed to higher temperatures. In other words, the cooling flow 40 may pass from an outside surface 61 to an inside surface 62. The outside and inside surfaces 61,62 may be defined with reference to a combustion chamber 63, as depicted in FIG. 1. The cooling flow 40 may cool the dome 28 by convection as it passes through the effusion holes 80 and by film cooling on the inside surface 62 after it is discharged.

Figure 10:
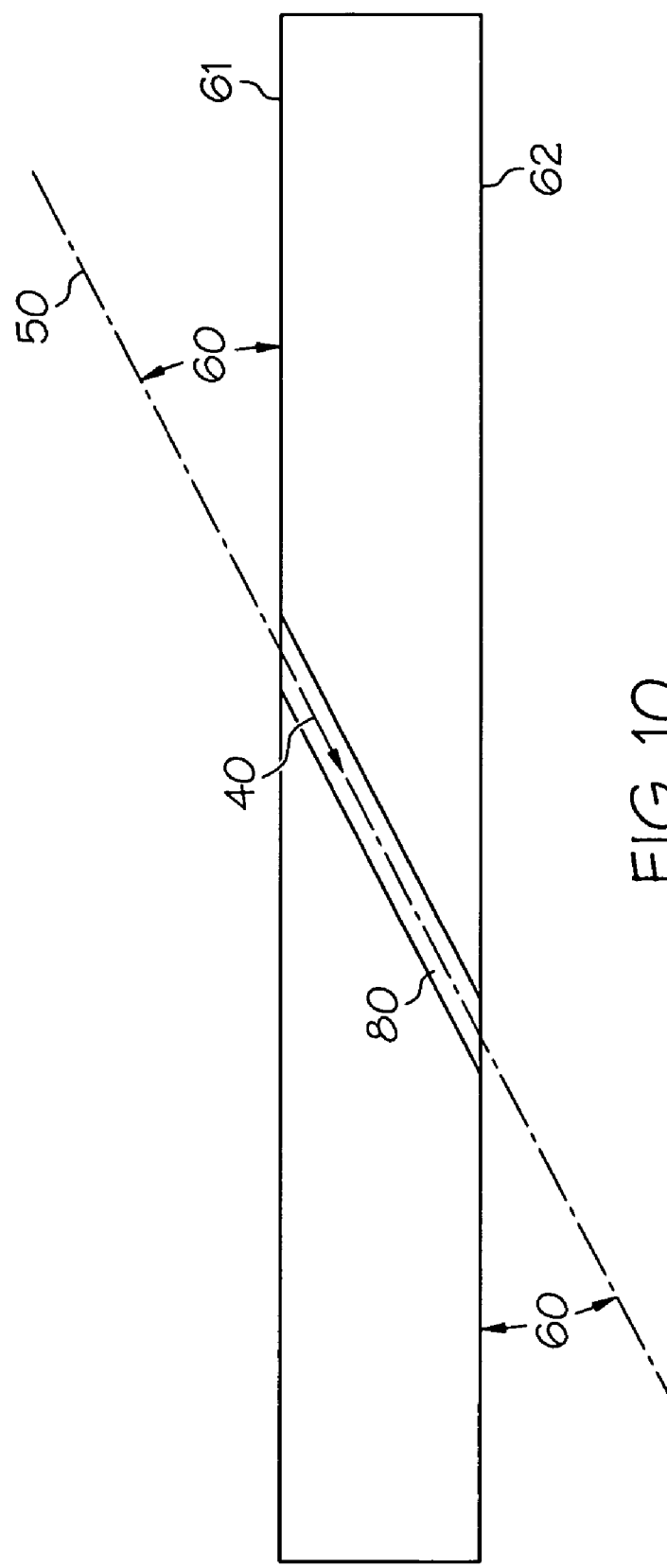
FIG. 10 is a cross-sectional view of an effusion hole according to another embodiment of the present invention.

Each effusion hole 80 may form an axial angle 60 with respect to a dome surface 52 (outside or inside surface 61,62), as depicted in FIG. 2. The axial angle 60, as better seen in FIG. 10, may be the angle formed by a centerline 50 of the effusion hole 80 and the dome surface (outside or inside surface 61,62). For some applications, the axial angle 60 may be between about 15° and about 30°. In other words, the effusion holes 80 may be angled so that the centerline 50 of the hole forms a 15 to 30 degree angle (axial angle 60) with respect to the surface of the dome 28. The axial angle 60 may increase the length of the hole through the dome 28 thus increasing the surface area from which the cooling flow 40 can extract heat from the dome material. The axial angle 60 may allow the cooling flow 40 to enter the combustor chamber 63 nearly parallel to the inside surface 62 so that a cooling film (not shown) is generated on the inside surface 62 of the dome 28.

The effusion holes 80 may be formed by conventional drilling techniques such as electrical-discharge machining (EDM), stationary percussion laser machining and percussion on-the-fly laser drilling or with complex casting techniques. The density of the effusion holes 80 may vary with application and may depend on factors including the dimensions of the combustor 20, the composition of the dome 28, the velocity of the cooling flow 40, and the temperature of the combustion gases. For some combustor applications, the density of the effusion holes 80 may be between about 10 and about 100 holes/in$^2$ of surface area of the dome 28. For some applications, the effusion holes 80 may be uniformly spaced on the dome 28. Alternatively, the effusion holes 80 may be unevenly spaced to provide more cooling flow 40 to "hot spots" on the dome 28. The effusion holes 80 may be round in cross-section, however, other shapes may be useful with the present invention. For example, the effusion holes 80 may be oval, egg-shaped or tapered. The diameter of the effusion holes 80 may vary with application and may depend on factors including, the dimensions of the dome 28, the temperature of the combustion gases, and the velocity of the cooling flow 40. For some applications, the effusion holes 80 may have a diameter between about 0.01 and about 0.04 inches.

Figure 3:
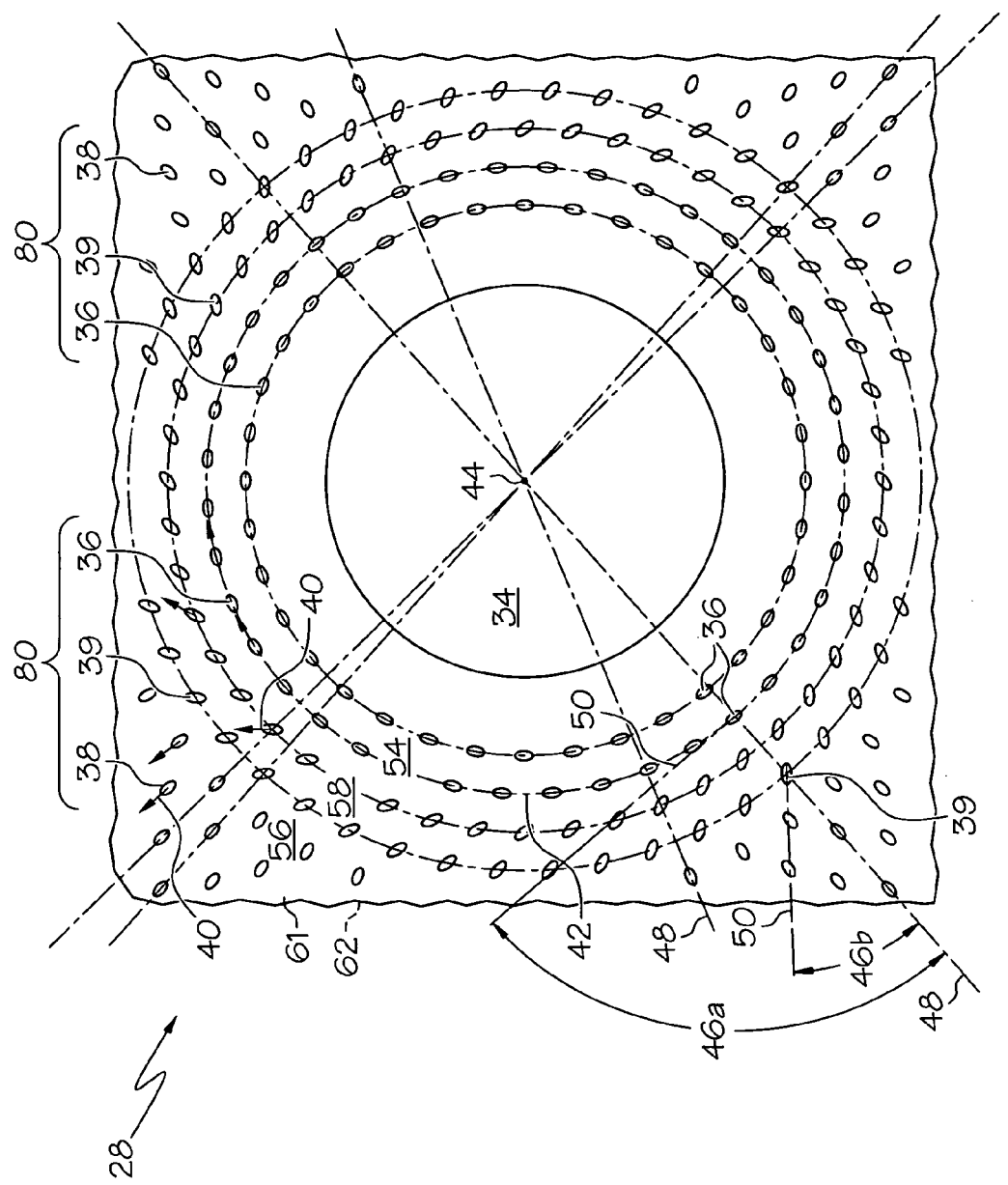
FIG. 3 is a plan view aft looking forward of a section of a combustor dome according to another embodiment of the present invention.
Figure 4:
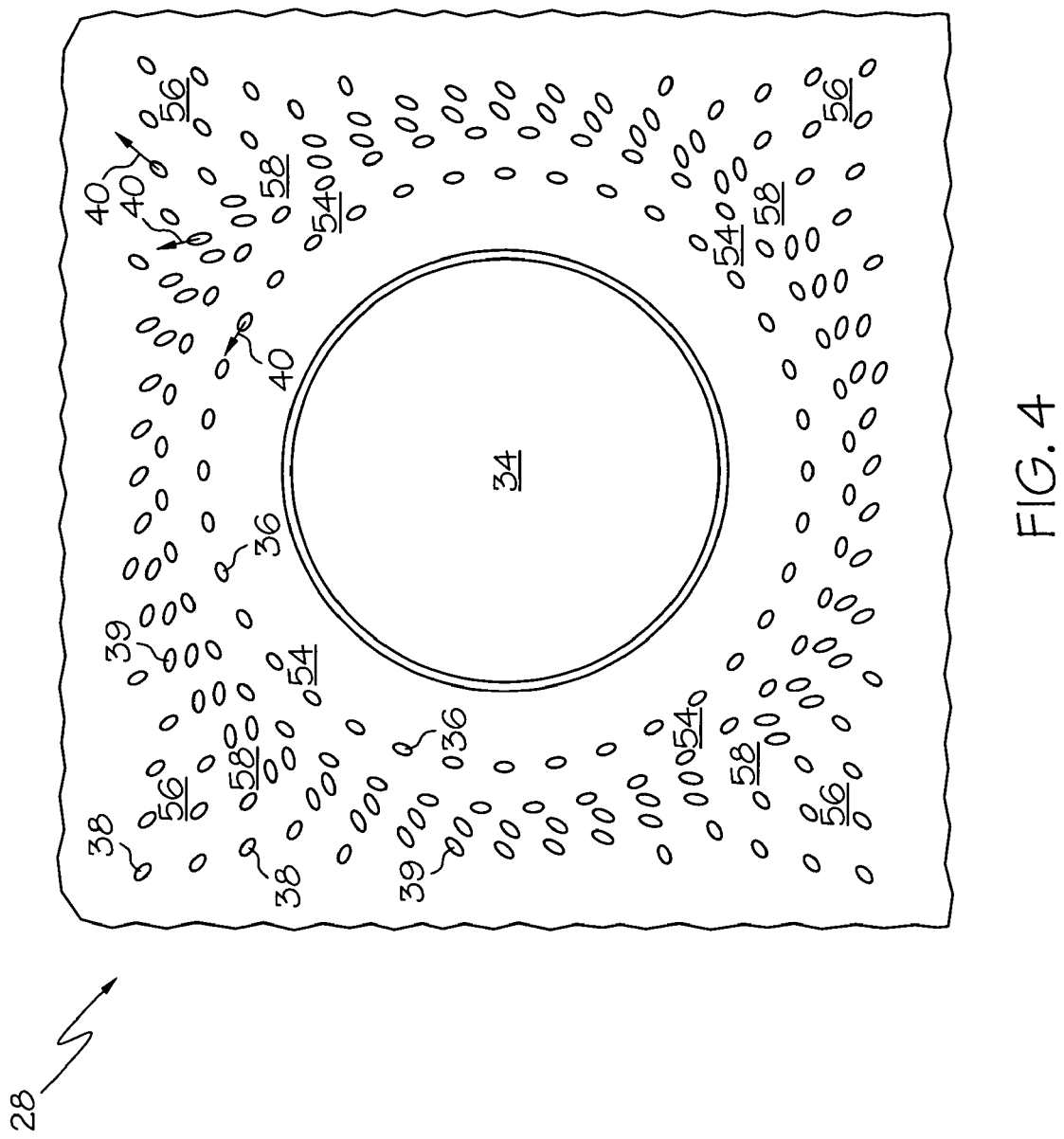
FIG. 4 is a plan view forward looking aft of the dome of FIG. 3.

The effusion holes 80 may include at least one tangential effusion hole 36 and at least one radial effusion hole 38, as depicted in FIG. 2. For some applications, the effusion holes 80 further may include at least one transitional effusion hole 39, as depicted in FIGS. 3 and 4. The effusion holes 80 may be a generic term and may comprise the tangential, radial and transitional effusion holes 36,38,39. The tangential, radial and transitional effusion holes 36,38,39 may be distinguished from one another by their orientation with respect to the fuel injector.

The tangential effusion hole 36 may direct the cooling flow 40 in a tangential direction along a circular line 42 around an injector axis 44, as depicted in FIG. 2. The radial effusion hole 38 may direct the cooling flow 40 in a radial direction away from the fuel injector. Radial and axial may be defined with reference to the injector axis 44. The transitional effusion hole 39 may direct the cooling flow 40 such that the angle of the cooling flow 40 transitions from the tangential flow of the tangential effusion hole 36 to the radial flow of the radial effusion hole 38. In some embodiments, the tangential effusion holes 36 may reduce dome temperatures in the initial region of low film effectiveness near the fuel injectors and the radial effusion holes 38 may reduce dome temperatures in the corner regions between the injectors.

The tangential effusion hole 36 may form a tangential angle 46a with respect to a radial line 48 of the opening 34, as depicted in FIG. 2. The tangential angle 46a may be the angle formed by the centerline 50 through the tangential effusion hole 36 projected onto the dome surface 52 (outside or inside surface 61,62) and the radial line 48. The direction of the cooling flow 40 through the tangential effusion hole 36 may depend on the tangential angle 46a because the cooling flow 40 may follow the centerline 50 of the hole. The tangential angle 46a may vary and may depend on the application. For some applications, the tangential angle 46a may be between about 75° and about 90°. In other words, the tangential effusion hole 36 may be angled between about 75° and about 90° from radial.

Figure 9:
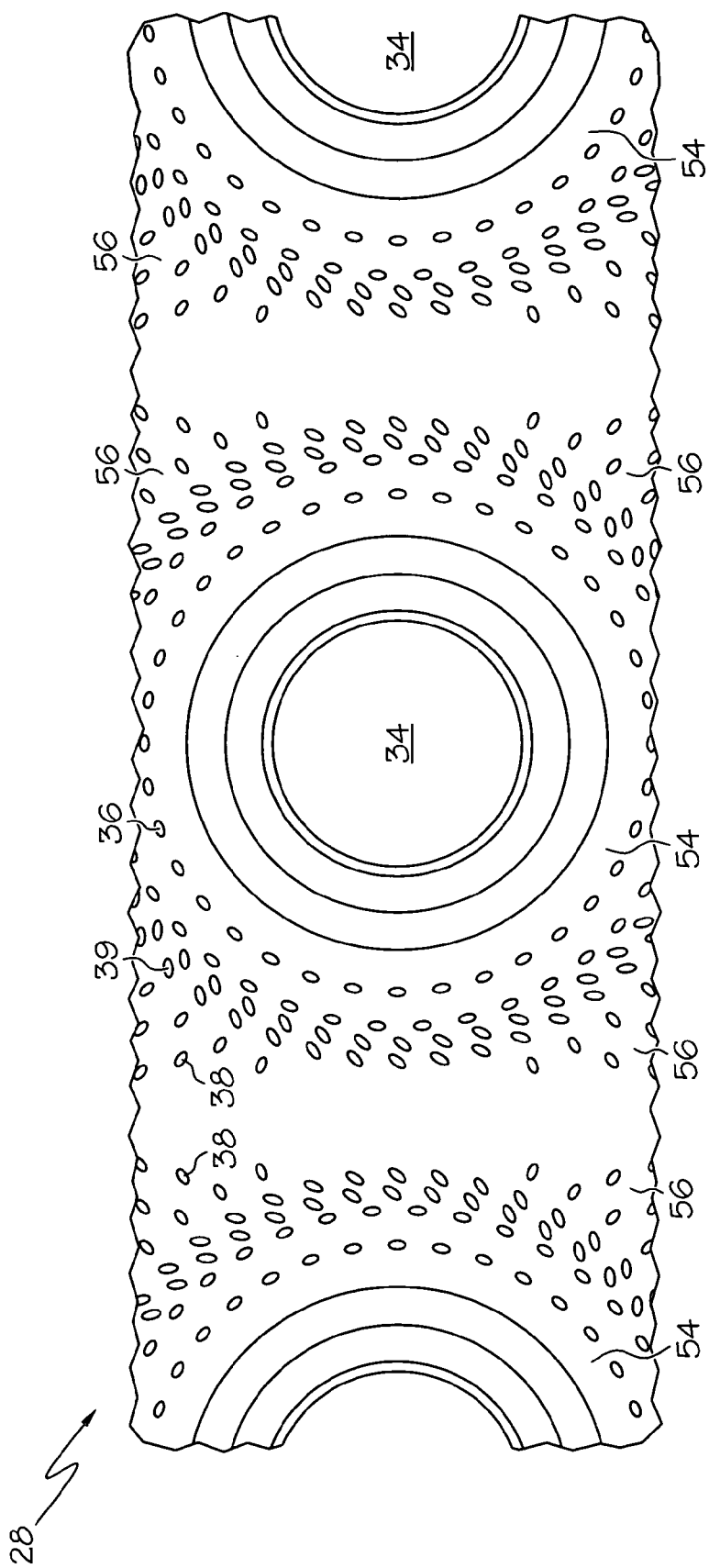
FIG. 9 is a plan view forward looking aft of a section of combustor dome according to another embodiment of the present invention.

The dome 28 may comprise a plurality of tangential effusion holes 36. For some applications, the tangential effusion holes 36 may be positioned in a row along the circular line 42. Embodiments of the present invention may comprise at least one row of tangential effusion holes 36. For example, one embodiment may comprise three rows of tangential effusion holes 36, as depicted in FIG. 2. Another embodiment, depicted in FIG. 3, may comprise two rows and a third embodiment, depicted in FIG. 9, may comprise one row of tangential effusion holes 36. The number of rows of tangential effusion holes 36 may vary and may depend on factors including the dimensions and composition of the dome 28, the dimensions of the tangential effusion hole 36, and the cooling requirements of the application. The number and density of the tangential effusion holes 36 may vary with application. Computational fluid dynamic (CFD) analysis may be useful in determining the desired number of rows and the density of the tangential effusion holes 36 for a particular application.

Figure 7:
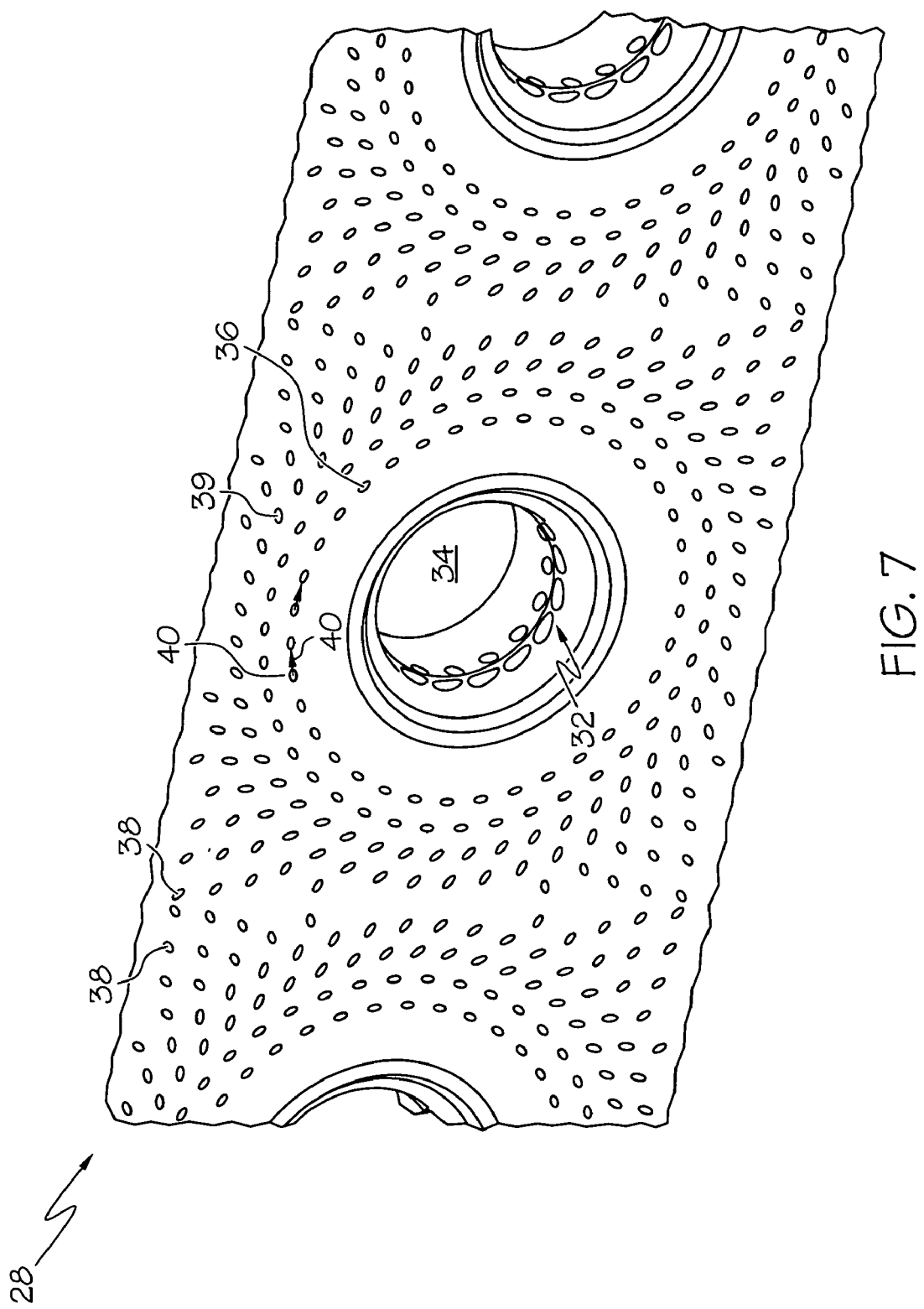
FIG. 7 is a perspective view aft looking forward of a section of a combustor dome according to another embodiment of the present invention.
Figure 8:
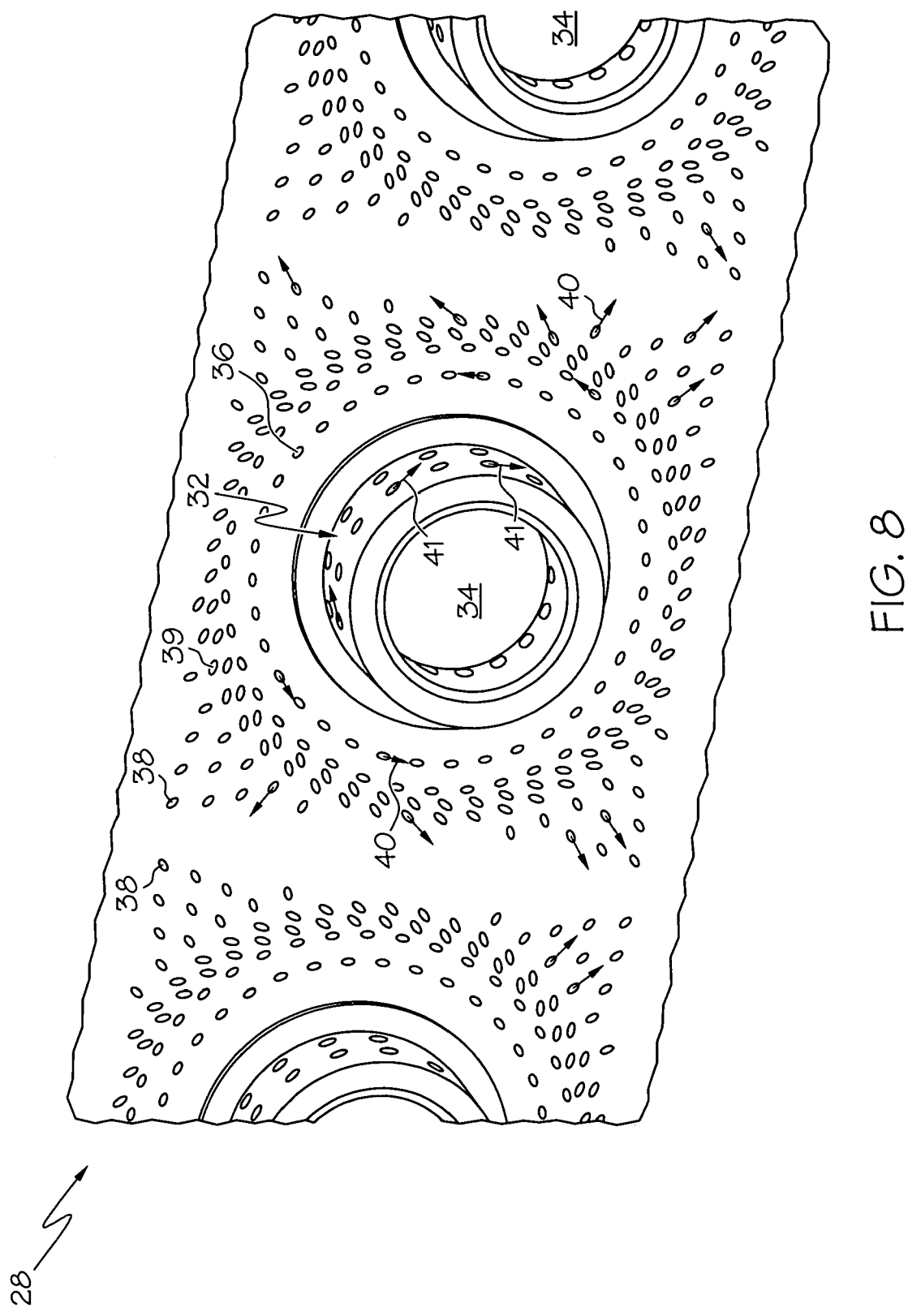
FIG. 8 is a perspective view forward looking aft of the dome of FIG. 7.

The tangential effusion holes 36 may direct the cooling flow 40 tangentially such that there may be no "beginning" to the effusion cooling film due to the cyclic nature of the circumferential direction. With no beginning, the initial region of low film effectiveness may be reduced. For some applications, the cooling flow 40 from the tangential effusion holes 36 may be supplemented by a swirler air flow 41 from the air swirler 32, as depicted in FIGS. 7 and 8. For some applications, the tangential effusion holes 36 may be adapted such that the swirl of the cooling flow 40 from the tangential effusion holes 36 may be counter to the swirl of the swirler air flow 41. Adapting the tangential effusion holes 36 to provide the cooling flow 40 counter to the swirler air flow 41 may reduce emission for some applications.

Figure 5:
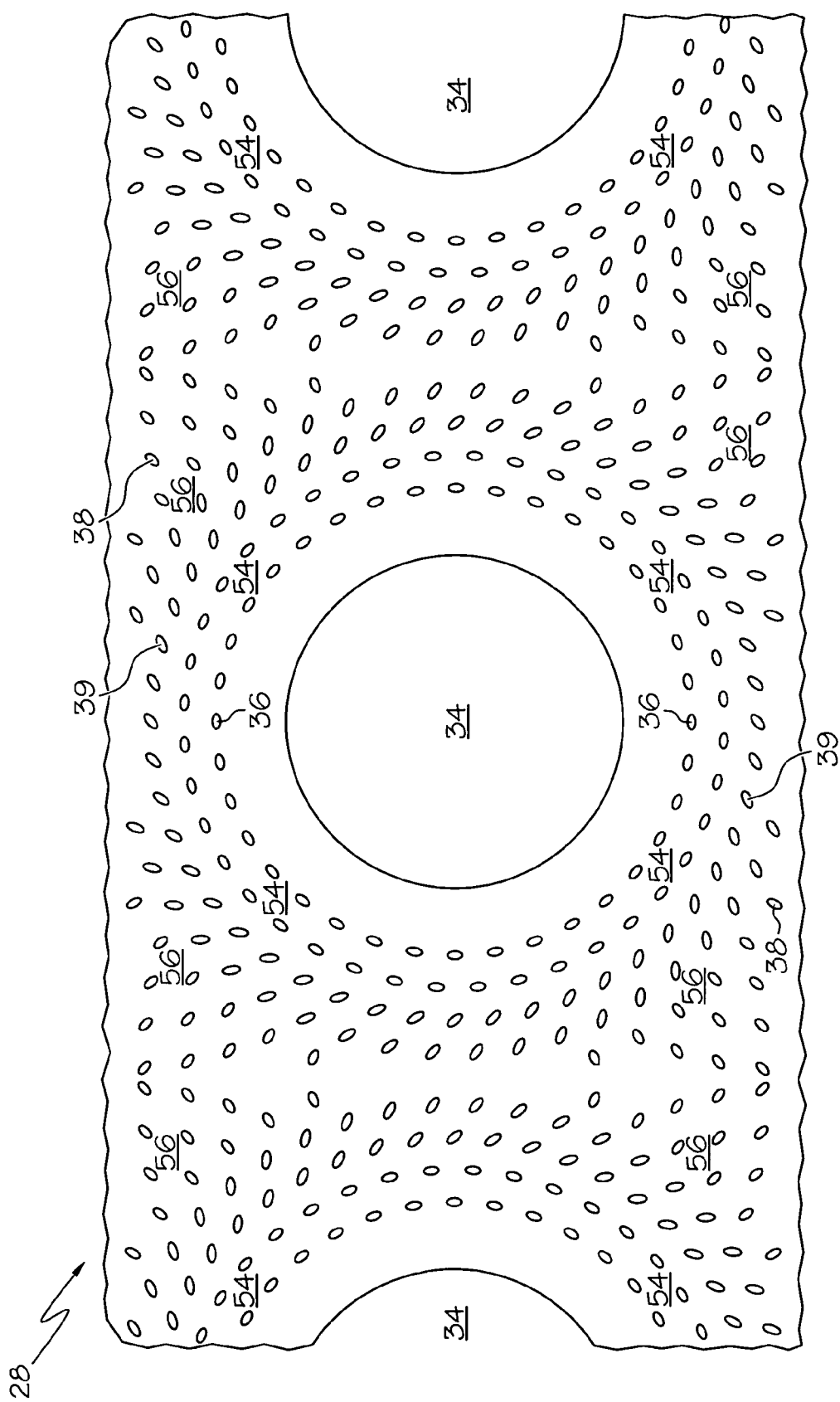
FIG. 5 is a plan view aft looking forward of a section of a combustor dome according to another embodiment of the present invention.
Figure 6:
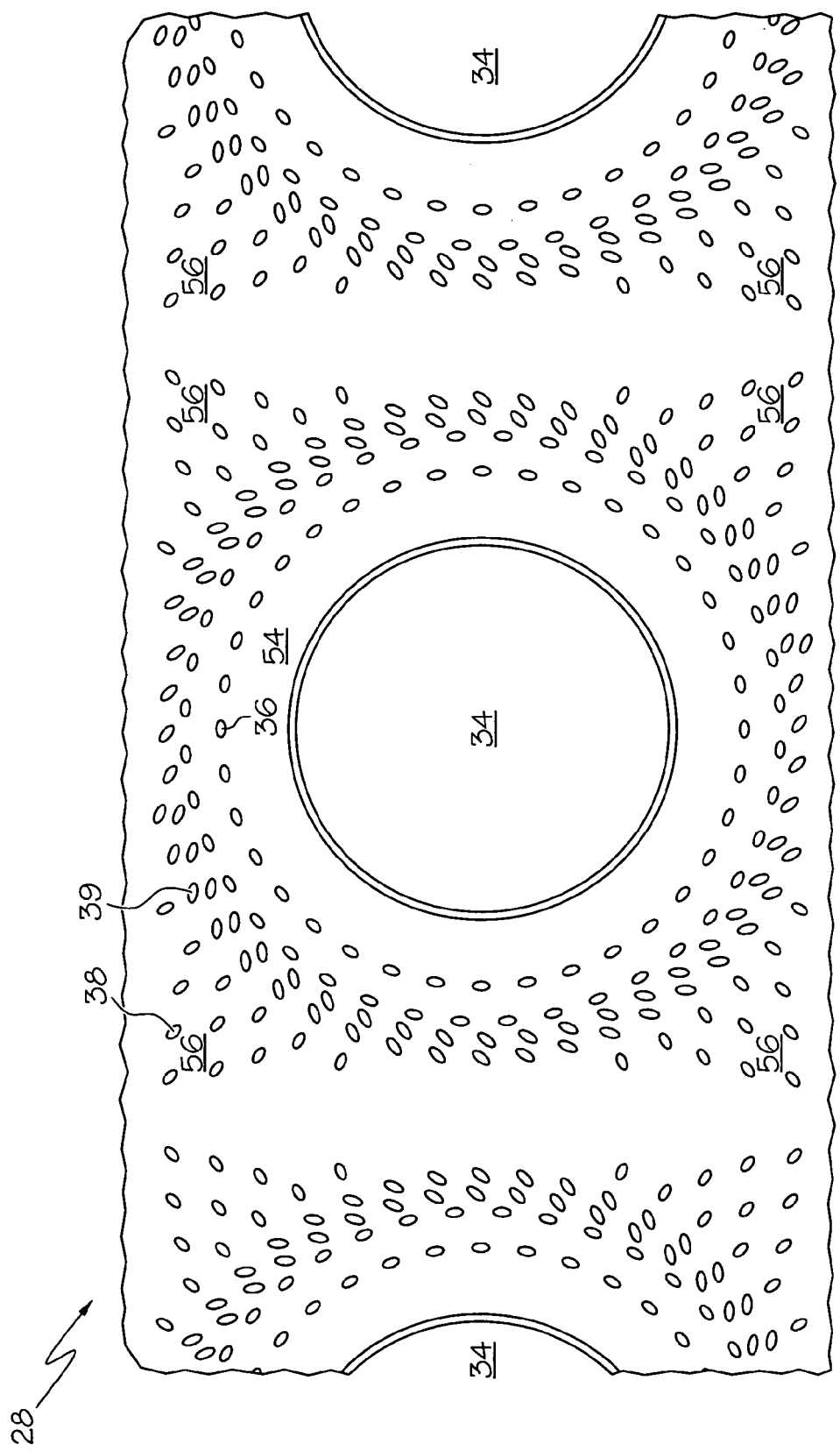
FIG. 6 is a plan view forward looking aft of the dome of FIG. 5.

In one embodiment, the tangential effusion holes 36 may be positioned in a radially inward area 54 of the dome 28, as depicted in FIG. 2. In an alternate embodiment, the tangential effusion holes 36 may be positioned in a radially outward area 56 of the dome 28, as depicted in FIG. 1. The radially inward area 54 and the radially outward area 56 may be defined with reference to the radial line 48. The radially inward area 54 may be the area of the dome 28 that is towards the fuel injector. For a can combustor having one fuel injector, there may be one radially inward area 54 and it may comprise a center portion of the dome. For an annular combustor having more than one fuel injector, there may be more than one radially inward area 54. The radially inward areas 54 of the annular combustor may comprise the portions of the dome that are towards the openings 34 for the fuel injectors, as depicted in FIGS. 5 and 6. Embodiments of the present invention may comprise at least one row of tangential effusion holes 36 positioned around each fuel injector. Because the fuel injector may be radially inward from the air swirler 32, embodiments of the present invention may comprise at least one row of tangential effusion holes 36 positioned around each air swirler 32. The radially outward areas 56 may comprise the "corner" portions of the annular combustor segments. In another embodiment (not shown), the tangential effusion holes 36 may be in an alternating pattern from one fuel injector to another fuel injector. For example, the tangential effusion holes 36 may be positioned in the radially inward area 54 on one fuel injector and in the radially outward area 56 on a second fuel injector. For some applications, the pattern of the tangential effusion holes 36 may vary from one fuel injector to another fuel injector. The pattern of the tangential effusion holes 36 may depend on the cooling requirements of the application.

The radial effusion hole 38 may be adapted to provide the cooling flow 40 in a direction away from the injector axis 44 and along the radial line 48, as depicted in FIG. 2. The centerline 50 through the radial effusion hole 38 projected onto the dome surface 52 may be the radial line 48; therefore, a tangential angle (not shown) of the radial effusion hole 38 may be zero degrees. The radial effusion hole 38 may be aligned on the radial line 48 and the tangential effusion hole 36 may be between about 75° and about 90° from the radial line 48. Therefore, the radial effusion holes 38 may be aligned at an angle of from about 75° to about 90° with respect to the tangential effusion holes 36 or visa versa. The direction of the cooling flow 40 through the radial effusion hole 38 may be radial because the cooling flow 40 may follow the centerline 50 of the hole. The dome 28 may comprise a plurality of radial effusion holes 38. The number of radial effusion holes 38 may vary and may depend on the cooling requirements of the application. CFD analysis may be useful in determining the desired number for a particular application. The radial effusion holes 38 may direct the cooling flow 40 to "hot spot" areas of the dome 28. For example, the radial effusion holes 38 may direct the cooling flow 40 to the "corner" portions of the annular combustor segments.

In one embodiment, the radial effusion hole 38 may be positioned in the radially outward area 56 of the dome 28, as depicted in FIG. 2. In this embodiment, the radial effusion hole 38 may be radially outward from the tangential effusion hole 36 and may direct the cooling flow 40 towards the corner region between fuel injectors. In an alternate embodiment, the radial effusion hole 38 may be positioned in the radially inward area 54 of the dome 28, as depicted in FIG. 1, and may direct the cooling flow 40 towards the tangential effusion hole 36. The positioning of the radial effusion holes 38 may vary and may depend on the cooling requirements of the application. CFD analysis may be useful in determining the desired number and positioning of the radial effusion holes 38 for a particular application The transitional effusion holes 39, as depicted in FIG. 3, may direct the cooling flow 40 such that the angle of the flow transitions from the tangential flow of the tangential effusion holes 36 to the radial flow of the radial effusion holes 38. As depicted in FIG. 3, a tangential angle 46b of the transitional effusion hole 39 may be less than the tangential angle 46a of the tangential effusion hole 36 and greater than the tangential angle (not shown) of the radial effusion hole 38. The tangential angle 46b may be the angle formed by the centerline 50 through the transitional effusion hole 39 projected onto the dome surface 52 (outside or inside surface 61,62) and the radial line 48. The tangential angle 46b of the transitional effusion holes 39 may be gradually reduced as the distance from the tangential effusion holes 36 is increased. For example, the tangential angle 46b of a transitional effusion hole 39 positioned towards the tangential effusion holes 36 may be about 70° and the tangential angle 46b of a transitional effusion hole 39 further away from the tangential effusion holes 36 may be about 60°. The tangential angle 46b of the transitional effusion holes 39 may be gradually reduced to zero to match the radial flow. The transitional effusion hole 39 may be positioned in a transition area 58 between and adjacent to the radially inward area 54 and the radially outward area 56.

Figure 11:
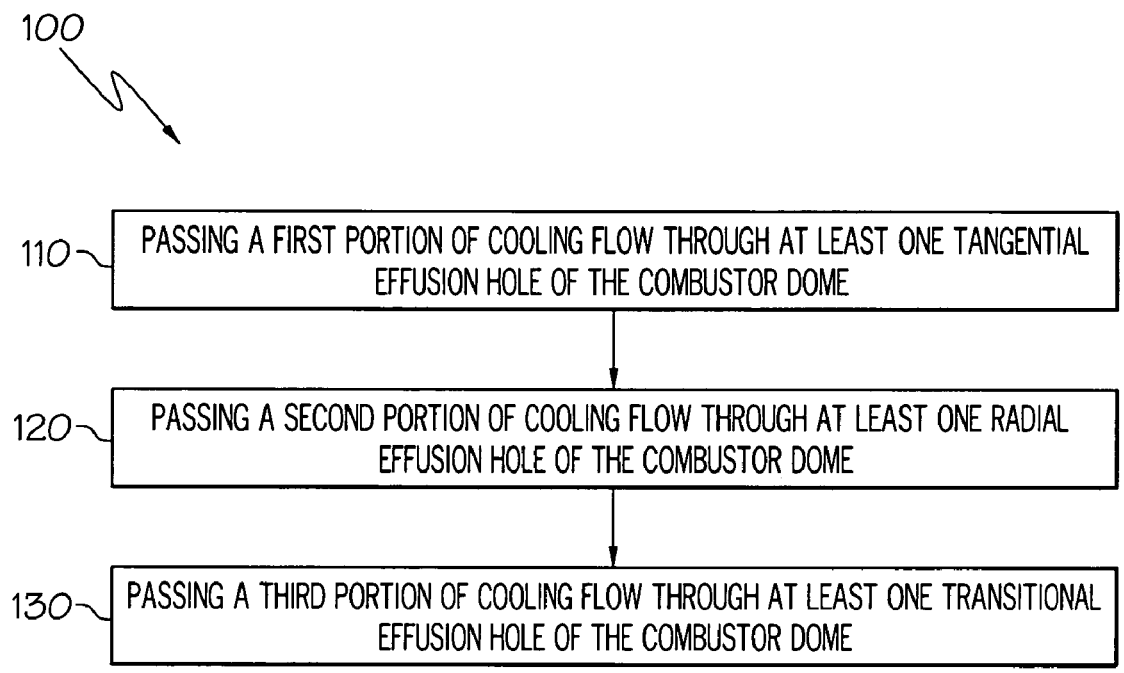
FIG. 11 is a flow chart of a method of cooling a combustor dome according to an embodiment of the present invention.

A method 100 of cooling a combustor dome is depicted in FIG. 11. The method 100 may comprise a step 110 of passing a first portion of cooling flow 40 through at least one tangential effusion hole 36 of the combustor dome 28 and a step 120 of passing a second portion of cooling flow 40 through at least one radial effusion hole 38 of the combustor dome 28. The method 100 may comprise a further step 130 of passing a third portion of cooling flow 40 through at least one transitional effusion hole 39 of the combustor dome 28.

The step 110 of passing a first portion of cooling flow may comprise passing the first portion of cooling flow such that a swirl of cooling flow 40 is formed around the injector axis 44 of the combustor dome 28. For some applications, the step 110 of passing a first portion of cooling flow 40 may comprise passing the first portion of cooling flow in a counter-rotating manner with respect to the air swirler 32 of the combustor dome 28. For some annular combustor applications, the step 110 may provide a swirl of cooling flow 40 around each injector axis 44 of the annular combustor dome.

The step 120 of passing a second portion of cooling flow 40 may comprise passing the second portion of cooling flow 40 radially outward from the injector axis 44 and towards the corner regions between fuel injectors. The step 130 of passing a third portion of cooling flow may direct the cooling flow such that the angle of the cooling flow transitions from the tangential flow of the tangential effusion holes to the radial flow of the radial effusion holes As can be appreciated by those skilled in the art, embodiments of the present invention provide improved cooling schemes for combustor domes. The present invention provides combustor cooling schemes that require no additional components, such as heat shields and louvers. Embodiments of the present invention reduce manufacturing costs due to a decrease in part count and an overall simplified design.

It should be understood, of course, that the foregoing relates to exemplary embodiments of the invention and that modifications may be made without departing from the spirit and scope of the invention as set forth in the following claims.

We claim:

1. A cooling scheme for a combustor dome comprising:
a plurality of tangential effusion holes positioned in said combustor dome and adapted to direct a first portion of cooling flow in a tangential direction around an injector axis of said combustor dome; and
a plurality of radial effusion holes positioned in said combustor dome and adapted to direct a second portion of cooling flow radially outward from said injector axis.

2. The cooling scheme of claim 1, wherein said tangential effusion holes are positioned in a radially inward area of said combustor dome.

3. The cooling scheme of claim 2, wherein said radial effusion holes are positioned in a radially outward area of said combustor dome.

4. The cooling scheme of claim 3, further comprising a plurality of transitional effusion holes positioned in a transition area between and adjacent to said radially inward area and said radially outward area.

5. The cooling scheme of claim 1, wherein said combustor dome includes at least one air swirler and said first portion of cooling flow is supplemented by a swirler air flow from said air swirler.

6. The cooling scheme of claim 5, wherein said tangential direction of said first portion of cooling flow is counter to a swirl of said swirler air flow.

7. The cooling scheme of claim 1, wherein at least one of the tangential effusion holes forms a tangential angle of between about 75° and about 90°.

8. The cooling scheme of claim 1, wherein each said radial effusion hole has a diameter between about 0.01 and about 0.04 inches.

9. The cooling scheme of claim 1, wherein said tangential effusion holes are positioned in a radially outward area of said combustor dome.

10. The cooling scheme of claim 9, wherein said radial effusion holes are positioned in a radially inward area of said combustor dome.

11. The cooling scheme of claim 10, further comprising a plurality of transitional effusion holes positioned in a transition area between and adjacent to said radially inward area and said radially outward area.

12. The cooling scheme of claim 1, wherein at least one of the tangential effusion holes forms an axial angle between about 15° and about 30°.

13. The cooling scheme of claim 1, wherein said combustor dome comprises an annular combustor dome.

14. A cooling scheme for a combustor dome comprising:
a plurality of effusion holes through said combustor dome, said plurality of effusion holes comprising at least one tangential effusion hole positioned in a radially inward area and at least one radial effusion hole positioned in a radially outward area.

15. The cooling scheme of claim 14, wherein said tangential effusion hole has a diameter between about 0.01 and about 0.04 inches.

16. The cooling scheme of claim 14, wherein said plurality of effusion holes includes at least one row of tangential effusion holes positioned around a fuel injector of said combustor dome.

17. The cooling scheme of claim 14, wherein an angle formed by a centerline of said radial effusion hole and a surface of said combustor dome is between about 15° and about 30°.

18. The cooling scheme of claim 14, wherein an angle formed by a centerline of said tangential effusion hole and a surface of said combustor dome is between about 15° and about 30°.

19. The cooling scheme of claim 14, wherein said tangential effusion hole is positioned in an area towards a fuel injector of said combustor dome.

20. The cooling scheme of claim 14, wherein said combustor dome is an annular combustor dome comprising a plurality of fuel injectors and wherein said plurality of effusion holes comprises at least one tangential effusion hole positioned towards each fuel injector.

21. The cooling scheme of claim 14, further comprising at least one transitional effusion hole positioned in a transition area between said tangential effusion hole and said radial effusion hole.

22. The cooling scheme of claim 14, wherein a density of said effusion holes is between about 10 and about 100 holes/in$^2$.

23. The cooling scheme of claim 14, wherein said radial effusion hole is aligned at an angle of from about 75° to about 90° with respect to said tangential effusion hole.

24. A cooling scheme for a combustor dome comprising:
a plurality of tangential effusion holes positioned through said combustor dome, said tangential effusion holes adapted to provide a tangential flow;
a plurality of radial effusion holes positioned through said combustor dome and radially outward from said tangential effusion holes, said radial effusion holes adapted to provide a radial flow; and
a plurality of transitional effusion holes positioned through said combustor dome, said transitional effusion holes adapted to direct a cooling flow such that the angle of the cooling flow transitions from the tangential flow of the tangential effusion holes to the radial flow of the radial effusion holes.

25. The cooling scheme of claim 24, wherein said tangential effusion holes are adapted to direct a swirl of cooling flow around an injector axis of said combustor dome.

26. The cooling scheme of claim 25, wherein said swirl of cooling flow is in a direction counter to a swirler air flow of said combustor dome.

27. A combustor for a gas turbine engine comprising:
an inner liner;
an outer liner positioned radially outward from said inner liner; and
a combustor dome positioned between and connected to said inner liner and said outer liner, said combustor dome having a plurality of tangential effusion holes and a plurality of radial effusion holes.

28. The combustor of claim 27, wherein said combustor dome is an annular combustor dome comprising a plurality of fuel injectors and wherein said plurality of tangential effusion holes comprises at least one row of tangential effusion holes positioned around each fuel injector.

29. The combustor of claim 27, wherein at least one radial effusion hole is directed towards a corner region of an annular combustor segment of said combustor dome.

30. The combustor of claim 27, wherein each tangential effusion hole forms a tangential angle of between about 75° and about 90°.

31. The combustor of claim 27, wherein said tangential effusion holes are positioned in a radially outward area of said combustor dome.

32. The combustor of claim 31, wherein said radial effusion holes are positioned in a radially inward area of said combustor dome.

33. An effusion array for an annular combustor dome having at least one air swirler comprising:
at least one row of tangential effusion holes positioned around said air swirler, said tangential effusion holes adapted to direct a swirl of cooling flow in a counter-rotating manner with respect to said air swirler, each tangential effusion hole forming a tangential angle of between about 75° and about 90° and forming an axial angle of between about 15° and about 30°, each tangential effusion hole having a diameter between about 0.01 and about 0.04 inches;
a plurality of radial effusion holes positioned radially outward from said tangential effusion holes, said radial effusion holes adapted to direct a cooling flow radially outward from said air swirler, each radial effusion hole forming an axial angle of between about 15° and about 30° and having a diameter between about 0.01 and about 0.04 inches; and
a plurality of transitional effusion holes positioned between said tangential effusion holes and said radial effusion holes, said transitional effusion holes adapted to direct a cooling flow such that the angle of the cooling flow transitions from the tangential flow of the tangential effusion holes to the radial flow of the radial effusion holes.

* * * * *